(No Model.)
A. R. TIFFANY.
BELT SHIFTER.
No. 324,190. Patented Aug. 11, 1885.
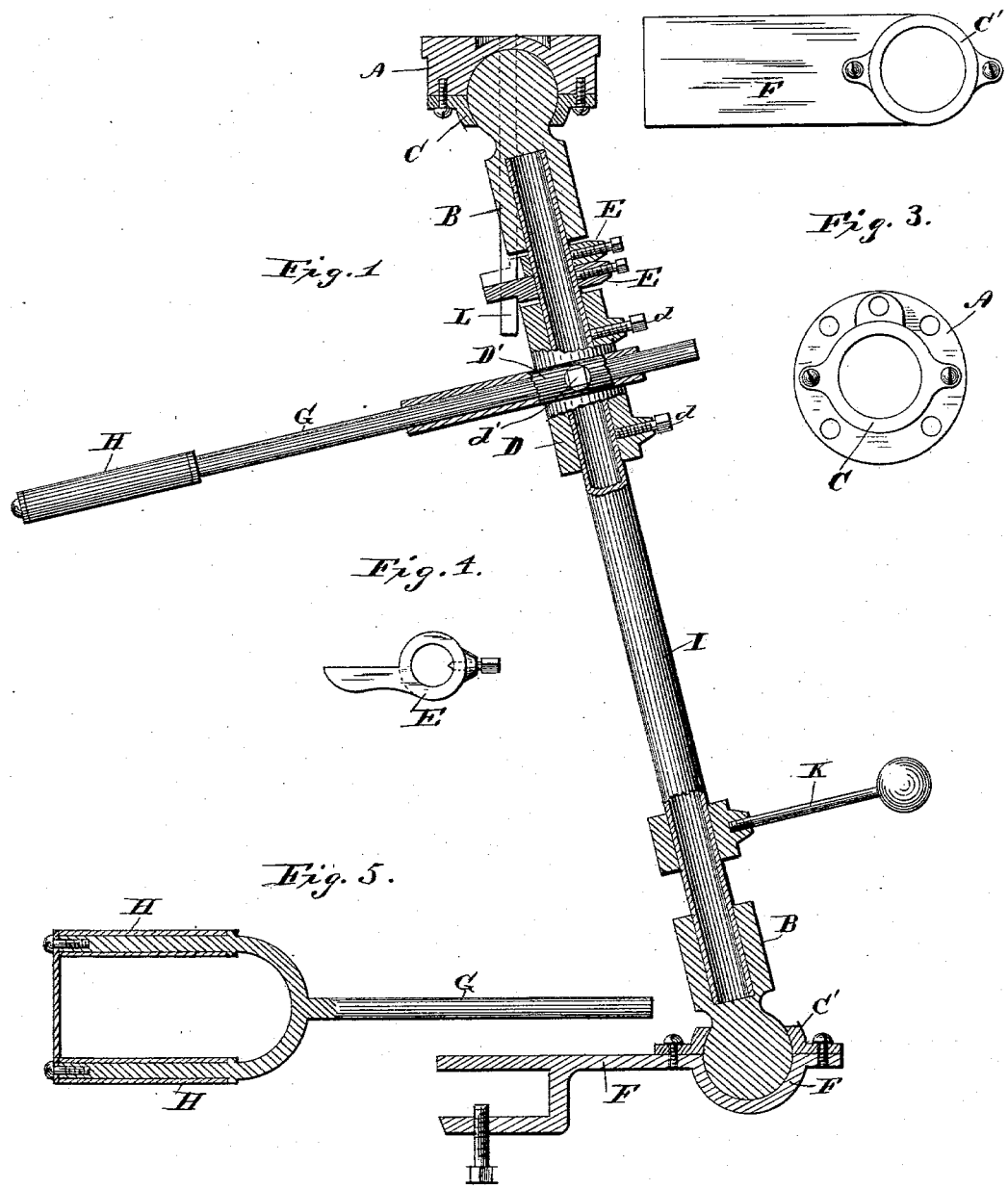

UNITED STATES PATENT OFFICE.

ALBERT R. TIFFANY, OF DAYTON, OHIO, ASSIGNOR OF ONE-HALF TO JOHN J. LELAND, OF SAME PLACE.

BELT-SHIFTER.

SPECIFICATION forming part of Letters Patent No. 324,190, dated August 11, 1885.

Application filed July 1, 1885. (No model.)

*To all whom it may concern:*

Be it known that I, ALBERT R. TIFFANY, of Dayton, in the county of Montgomery and State of Ohio, have invented certain new and useful Improvements in Belt-Shifters; and I do hereby declare the following to be a full, clear, and exact description of the same, reference being had to the accompanying drawings, forming a part of this specification, and to the figures and letters of reference marked thereon.

My invention consists of an improved adjustable belt-shifting device applicable to machinery generally, and constructed substantially as will be hereinafter fully described and claimed.

In the accompanying drawings, Figure 1 represents a sectional elevation of my invention; Fig. 2, a plan view of the lower socket and clamp; Fig. 3, a plan view of the upper socket; Fig. 4, a view of one of the stops for limiting the extent of rotation of the shaft or rod in its bearings. Fig. 5 is a plan view, partially in section, of the bifurcated or forked shifting-rod.

Similar letters of reference in the several figures indicate the same parts.

The letter I represents a shaft or rod made preferably tubular and of gas-pipe. Each end of this rod fits within a socket, B, having a ball upon its end, as shown. The ball of the upper socket has its bearing in a correspondingly-shaped box or seat, A, and is held thereto by means of a collar or ring, C, as shown, while the ball of the lower socket has its bearing in a correspondingly-shaped portion, F', of a clamp, F, being kept in place by another ring or plate, C'.

The box A is preferably fastened to the ceiling or to any other suitable support above the pulley; but the clamp F, by reason of the universal-jointed connections offered by the universal joint-couplings, is enabled to be swung in either direction and clamped to the table or other part of the machine with which the shifter is to be used.

Mounted upon the rod I so as to be capable of rotating as well as sliding longitudinally is a sleeve, D, having another sleeve, D', connected to or formed with it for the passage of the shank of a shifter-arm, G. Set-screws $dd$ are provided for the purpose of securing the said sleeve D at any desired point of adjustment on the rod I, and another set-screw, $d'$, is provided for in like manner clamping the shank of the shifter-arm.

The outer end of the shifter-arm is forked or bifurcated, and each portion of the fork is provided with a friction-sleeve, H. These friction-sleeves enable the largest belts to be shifted with the minimum amount of strain upon the parts. A cross piece or strap secured by suitable screws to the ends of the fork operate to keep the friction-sleeves in place, as well as to prevent the escape of the belt.

A handle, K, secured to the rod I enables said rod to be turned and swung into the proper position, and adjustable stops E E, secured by set-screws to the rod I, co-operate with a rigid stop, L, depending from the upper box, to limit the range of rotary movement of the rod I upon its longitudinal axis.

It will be seen that the arrangement of parts in this contrivance is such that it is capable of the most complete adjustment, and can be adapted to shift the belt of any machine with which a shifter is required. When the belt by the proper adjustment of the parts is confined within the fork of the shifter-arm, the belt can be thrown from a lower to a higher pulley, or vice versa, by turning the rod I by means of the handle K, the stops E being so placed with reference to pin L as to prevent the belt being thrown too far.

I preferably locate my device on the side of the machine on which the operator stands, so that without leaving his position he may shift his belt quickly and with ease.

I claim as my invention—

1. The combination, with the main rod or shaft and the belt-shifter arm, of the universal-joint connection at the upper and lower ends of the said rod, substantially as described.

2. The combination, with the rod or shaft and the belt-shifting arm, of the universal-joint connection above and the universal-joint connection and clamp below, substantially as described.

3. The combination, with the rotatable shaft or rod and the belt-shifting arm, of the universal-joint connection above and below and the clamp for securing the device to the table of the machine, substantially as described.

4. The combination of the rod or shaft, the sockets at the upper and lower ends provided with the ball-heads, the upper and lower bearings for the heads of said sockets, and the clamp connected to the bearing for the lower ball-head, substantially as described.

5. The combination, with the rotatable shaft or rod and the belt-shifting arm, of the stops for regulating the extent of rotation of said shaft or rod, substantially as described.

6. The combination of the shaft or rod having the universal-joint connection at the upper and lower ends, the adjustable sleeve mounted thereon and having the sleeve for the passage of the shank of the shifter-arm, and the means for securing said shank to said last-mentioned sleeve, substantially as described.

7. The combination of the shaft or rod having the universal-joint connection at the upper and lower ends, the adjustable sleeves, and the shifting-arm having the friction-sleeves on its forked or bifurcated portion, substantially as described.

8. The combination, with the forked or bifurcated shifter-arm and its friction-sleeves, of the bar or strap secured to the fork and operating to hold the friction-sleeves in place, as well as to prevent the escape of the belt.

9. The combination, with the shaft or rod having the universal joints above and below, of the clamp attached to the lower bearing and the adjustable bifurcated belt-shifter arm, the handle for operating and the adjustable stops for limiting the motion of the same, substantially as described.

ALBERT R. TIFFANY.

Witnesses:
 JOHN J. LELAND,
 SUMNER T. SMITH.